US011887216B2

(12) United States Patent
Kalarot et al.

(10) Patent No.: US 11,887,216 B2
(45) Date of Patent: Jan. 30, 2024

(54) HIGH RESOLUTION CONDITIONAL FACE GENERATION

(71) Applicant: ADOBE INC., San Jose, CA (US)

(72) Inventors: Ratheesh Kalarot, San Jose, CA (US); Timothy M. Converse, San Francisco, CA (US); Shabnam Ghadar, Menlo Park, CA (US); John Thomas Nack, San Jose, CA (US); Jingwan Lu, Santa Clara, CA (US); Elya Shechtman, Seattle, WA (US); Baldo Faieta, San Francisco, CA (US); Akhilesh Kumar, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 218 days.

(21) Appl. No.: 17/455,796

(22) Filed: Nov. 19, 2021

(65) Prior Publication Data

US 2023/0162407 A1    May 25, 2023

(51) Int. Cl.
*G06T 5/00*    (2006.01)
*G06T 11/00*    (2006.01)
*G06N 3/08*    (2023.01)
*G06V 40/16*    (2022.01)

(52) U.S. Cl.
CPC ............... *G06T 11/00* (2013.01); *G06N 3/08* (2013.01); *G06V 40/168* (2022.01); *G06V 40/172* (2022.01)

(58) Field of Classification Search
CPC  G06V 40/168–40/171; G06V 40/172–40/173; G06T 11/00; G06N 3/094
See application file for complete search history.

(56) References Cited

PUBLICATIONS

Andy Wang, a Thesis, titled "High resolution neural frontal face synthesis from face encodings using adversarial loss", Thesis: M. Eng., Massachusetts Institute of Technology, Department of Electrical Engineering and Computer Science, 2019, copyright 2019, published by the Massachusetts Institute of Technology, Jun. 2019, 3 bib pages, and thesis pp. 1-51. (Year: 2019).*

(Continued)

*Primary Examiner* — Brian Werner
(74) *Attorney, Agent, or Firm* — F. CHAU & ASSOCIATES, LLC

(57) ABSTRACT

The present disclosure describes systems and methods for image processing. Embodiments of the present disclosure include an image processing apparatus configured to generate modified images (e.g., synthetic faces) by conditionally changing attributes or landmarks of an input image. A machine learning model of the image processing apparatus encodes the input image to obtain a joint conditional vector that represents attributes and landmarks of the input image in a vector space. The joint conditional vector is then modified, according to the techniques described herein, to form a latent vector used to generate a modified image. In some cases, the machine learning model is trained using a generative adversarial network (GAN) with a normalization technique, followed by joint training of a landmark embedding and attribute embedding (e.g., to reduce inference time).

20 Claims, 10 Drawing Sheets

(56) References Cited

PUBLICATIONS

Zhu et al., "One Shot Face Swapping on Megapixels", 2021 IEEE/CVF Conference on Computer Vision and Pattern Recognition (CVPR), Date of Conference: Jun. 20-25, 2021; Date Added to IEEE Xplore: Nov. 2, 2021; 2 bib pages and article pp. 4832-4842. (Year: 2021).*

Li et al, "Convolutional Network for Attribute-driven and Identity-preserving Human Face Generation", arXiv:1608.06434v1 [cs.CV] Aug. 23, 2016, pp. 1-9. (Year: 2016).*

Karras, et al., "A Style-Based Generator Architecture for Generative Adversarial Networks", arXiv preprint arXiv:1812.04948v3 [cs.Ne] Mar. 29, 2019, 12 pages.

* cited by examiner

HIGH RESOLUTION CONDITIONAL FACE GENERATION

BACKGROUND

The following relates generally to image processing, and more specifically to conditional face generation.

Digital image processing refers to the use of a computer to edit a digital image using an algorithm or a processing network. For example, an image may be processed using image processing software. Image processing software is commonly used for image editing, robot navigation, etc. In some cases, image processing may include synthetic face generation and editing.

Image editing is a subtask of image processing that modifies a digital image to meet user expectations. Image editing may include image cropping, size alteration, color change, etc. In some cases, image editing may be performed on well-constrained domains such as faces. For example, an input image (e.g., a source image) that depicts the face of a person can be edited to improve or alter the appearance of the face, to change the face to have an identity different from the original face of the source image, etc.

However, conventional image editing systems have limited functionality, may be cumbersome to some users, and may generate random images that may not be desired by users. For example, these systems provide limited control, or no control, on the image attributes that can be altered and may result in distortions that then require additional corrective inputs. Therefore, there is a need in the art for improved image editing systems that generate face images while providing precise control over multiple face attributes.

SUMMARY

The present disclosure describes systems and methods for image processing. Embodiments of the present disclosure include an image processing apparatus configured to generate modified images (e.g., synthetic faces) by conditionally changing attributes or landmarks of an input image. A machine learning model encodes the input image to obtain a joint conditional vector that represents both attributes and landmarks of the input image in a vector space. The joint conditional vector is then modified to form a latent vector, which is used to generate a modified image. In some cases, the machine learning model is trained using a generative adversarial network (GAN) techniques, in addition to joint training based on landmark embeddings and attribute embeddings.

A method, apparatus, non-transitory computer readable medium, and system for high resolution conditional face generation are described. One or more aspects of the method, apparatus, non-transitory computer readable medium, and system include receiving an input image of a face comprising a plurality of input attributes and a plurality of input facial landmarks; encoding the image to obtain a joint conditional vector representing the plurality of input attributes and the plurality of input facial landmarks using a joint embedding component, wherein the joint embedding component is trained to encode the plurality of input attributes and the plurality of input facial landmarks using an attribute loss and a landmark loss; generating a latent vector based on the joint conditional vector; and generating a modified image based on the latent vector.

A method, apparatus, non-transitory computer readable medium, and system for high resolution conditional face generation are described. One or more aspects of the method, apparatus, non-transitory computer readable medium, and system include receiving a training image of a face comprising a plurality of input attributes and a plurality of input facial landmarks; encoding the image to obtain a joint conditional vector representing the plurality of input attributes and the plurality of input facial landmarks using a joint embedding component; generating a latent vector based on the joint conditional vector; generating a modified image having the plurality of attributes and the plurality of facial landmarks based on the latent vector; computing an attribute loss by comparing attributes of the modified image to the plurality input attributes; computing a landmark loss by comparing facial landmarks of the modified image to the plurality of input facial landmarks; and updating parameters of the joint embedding component based on the attribute loss and the landmark loss.

An apparatus, system, and method for high resolution conditional face generation are described. One or more aspects of the apparatus, system, and method include a joint embedding component configured to receive an input image of a face comprising a plurality of input attributes and a plurality of input facial landmarks and to encode the image to obtain a joint conditional vector representing the plurality of input attributes and the plurality of input facial landmarks using a joint embedding component, wherein the joint embedding component is trained to encode the plurality of input attributes and the plurality of input facial landmarks using an attribute loss and a landmark loss; a mapping component configured to generate a latent vector based on the joint conditional vector; and a generator network configured to generate a modified image based on the latent vector.

DETAILED DESCRIPTION

Figure 1:
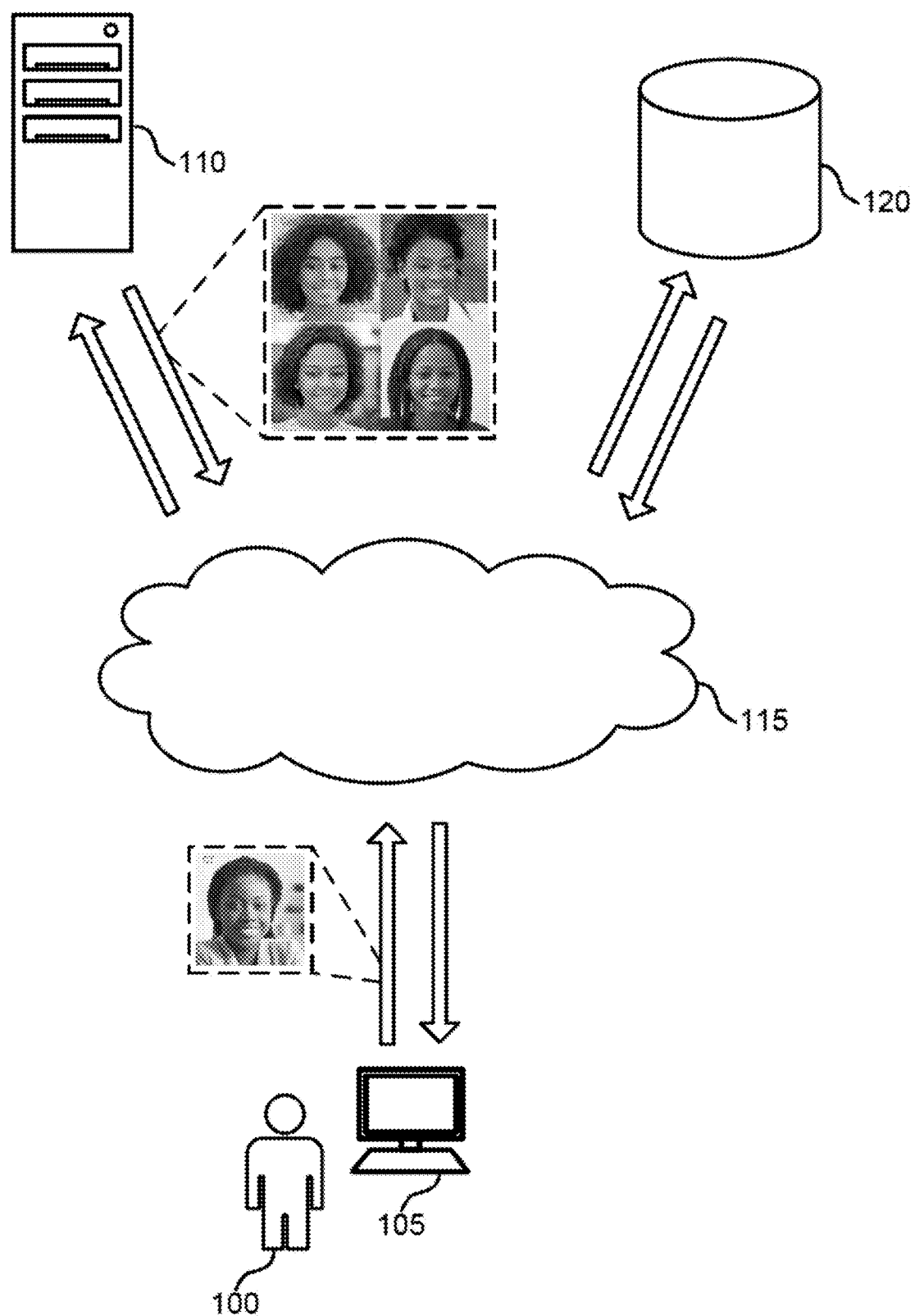
FIG. 1 shows an example of a face editing system according to aspects of the present disclosure.

The present disclosure describes systems and methods for image processing, and more specifically for conditional face generation. Embodiments of the present disclosure include an image processing apparatus including a machine learning model configured to conditionally modify an input image, for example, to modify a face in the input image, to generate synthetic faces, etc. For instance, generated images may be used for portrait personalization, face anonymization, face portrait portfolio diversification, face swapping, etc.

Image generation systems are used to generate new images from an existing image or dataset. In some examples, conventional systems diversify portrait portfolio by manually capturing pictures in a same settings which may be time-consuming and expensive. In some cases, generative adversarial network (GAN) techniques may be used that generate random images or images conditioned on limited attributes which may not be desired by users. For example, neural filters in an image editing software may facilitate slider-based attribute editing of a face. However, slider-based methods take more time to perform face generation and are less effective. Further, in some cases, these methods may not change the identity of the face in an image.

Embodiments of the present disclosure include an attribute and facial landmark conditioning system that modifies an input image based on a specified set of conditions. As an example, an input image of a face includes a set of attributes (e.g., age, expression, skin tone, etc.) and a set of facial landmarks (e.g., fiducial landmark points specifying the overall shape of the generated face, such as nose, eyes, mouth, etc.). According to techniques described herein, an input image is encoded to obtain a joint conditional vector (e.g., a multi-dimensional vector) that represents attributes and facial landmarks of the input image in a vector space. A latent vector generated based on the joint conditional vector (e.g., in accordance with certain conditions or edit commands) can then be used to generate one or more modified images from the input image.

For example, the joint conditional vector may be decomposed to obtain an attribute vector (e.g., a multi-dimensional vector representing face attributes) and a landmark vector (e.g., a multi-dimensional vector representing facial landmarks). Accordingly, the obtained attribute vector can be conditionally modified (e.g., based on edit commands from a user) to change attributes such as age, skin tone, etc. The modified attribute vector is then combined with the landmark vector to form the latent vector used to generate the modified image. Additionally or alternatively, a variable identity vector may be combined with the joint conditional vector in order to generate images with a different facial identify that are visually similar to the input image. In some examples, generated faces are warped to the original image to match the background of source and generated images.

By applying the unconventional technique of performing joint encoding of both input attributes and facial landmarks, embodiments of the present disclosure may be implemented to conditionally generate input image modifications with increased control over facial attributes (e.g., which may increase the diversity and quality of generated image modifications). Further, as described herein, a machine learning model may be trained using a GAN with a normalization technique, followed by joint training based on landmark embeddings and attribute embeddings (which can reduce training and inference time of the machine learning model). Accordingly, the techniques described herein may be implemented to perform face swapping or face modification of an input image using efficient and cost-effective means.

Embodiments of the present disclosure may be used in the context of a face editing system. For example, a face editing system based on the present disclosure may take an input image (e.g., a source image including a face), and efficiently generate a modified image (e.g., an output image including a synthetic face). An example of an application of the inventive concept in the conditional face modification context is provided with reference to FIGS. 1-3. Details regarding the architecture of an example image processing apparatus and machine learning network are provided with reference to FIGS. 4 and 5. Aspects of corresponding machine learning inference are described with reference to FIGS. 6 and 7. Description of training and evaluation of the machine learning model is also provided with reference to FIGS. 8-11.

Face Editing

FIG. 1 shows an example of a face editing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 4.

In the example of FIG. 1, the user 100 communicates with the image processing apparatus 110 via the user device 105. For example, the user 100 provides or selects an input image (e.g., a source image). In the example illustrated in FIG. 1, the input image includes an image representing a face. The user device 105 transmits the input image to the image processing apparatus 110 to modify one or more aspects of the input image. For instance, in the example of FIG. 1, a user 100 may, via user device 105, configure a conditional face generation operation based on the input image using image processing apparatus 110 (e.g., for portrait personalization, image object anonymization, etc.). Accordingly, image processing apparatus 110 may receive the input image and generate one or more modified images, as described in more detail herein.

As an example, an input image of a face includes a set of attributes (e.g., age, expression, skin tone, etc.) and a set of facial landmarks (e.g., fiducial landmark points specifying the overall shape of the generated face, such as nose, eyes, mouth, etc.). Upon receiving an input image, image processing apparatus 110 may encode the input image to obtain a joint conditional vector (e.g., a multi-dimensional vector) that represents attributes and facial landmarks of the input image in a vector space. Image processing apparatus 100 then decomposes the joint conditional vector to obtain an attribute vector (e.g., a multi-dimensional vector representing face attributes) and a landmark vector (e.g., a multi-dimensional vector representing facial landmarks). Accordingly, the image processing apparatus 110 may conditionally modify the obtained attribute vector (e.g., based on edit commands from a user 100), and the modified attribute vector can then be combined with the landmark vector to generate a modified image (e.g., a synthetic face based on the input image and edit commands from the user 100).

Additionally or alternatively, a variable identity vector may be combined with the joint conditional vector (e.g., without decomposition of the joint conditional vector or after decomposition/modification of the joint conditional vector) in order to generate images with a different facial identify that are visually similar to the input image. In some examples, generated faces are warped to the original image to match the background of source and generated images.

The user device 105 may be a personal computer, laptop computer, mainframe computer, palmtop computer, personal assistant, mobile device, or any other suitable processing apparatus. In some examples, the functions of the image processing apparatus 110 are preformed locally on the user device 105 (e.g., within an image editing software).

In some cases, the image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

In some examples, the user device 105 communicates with the image processing apparatus 110 via the cloud 115. A cloud 115 is a computer network configured to provide on-demand availability of computer system resources, such as data storage and computing power. In some examples, the cloud 115 provides resources without active management by the user 100. The term cloud 115 is sometimes used to describe data centers available to many users 100 over the Internet. Some large cloud networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

Conditional face generation may include multiple applications. For example, conditional face generation enables portfolio diversification resulting in cost effective face portrait portfolio generation for the users. Similarly, face swapping is a feature in face editing that may be used in a photo editing software. However, conventional methods for face swapping involve manually finding a matching (i.e., in terms of expression, lighting, face orientation, etc.) face by a user for swapping. Such methods are laborious and may not retrieve desired results. Thus, conditional face generation may provide a simple and fast alternative to the conventional methods.

Additionally, the face generation method may be used by marketers. In some examples, a face editor may use artificial intelligence to target certain markets or sectors. In some cases, marketers may not be able to find desired images using such face editors. As a result, images may need personalization to suit the needs of marketers. For example, an American woman doctor promoting a dental product may not suit the need of a marketer and hence a different and cohesive identity across a campaign of the marketers may be used. In some cases, the context is fixed while changing expressions such as dental pain, happiness, etc.

In some cases, generative adversarial network (GAN) solutions may generate random images or condition images on limited attributes. For example, a portrait portfolio may be diversified by manually taking multiple pictures of models in the same settings. Alternatively, users may search for similar images. However, manual capturing of pictures or finding matching images with multi attribute search constraints is inefficient and increases the costs for portfolio diversification.

In some cases, raster face editing methods (e.g., Face Aware liquify) are used to create realistic new identities which may not be feasible. Alternatively, neural filters in image editing software facilitate GAN inversion-based face editing that can generate visually different portrait images by slider-based attribute editing. In some cases, GAN inversion-based editing may be time-consuming and less effective. For example, slider-based attribute editing takes 10 seconds to perform GAN inversion and does not change the base identity of the person. Additionally, the editing uses manual effort to edit slider values.

Accordingly, the present disclosure describes systems and methods for conditional face generation. Embodiments of the present disclosure include an image generation apparatus configured to provide a fine-grain control over multiple face attributes to generate diverse results.

Figure 2:
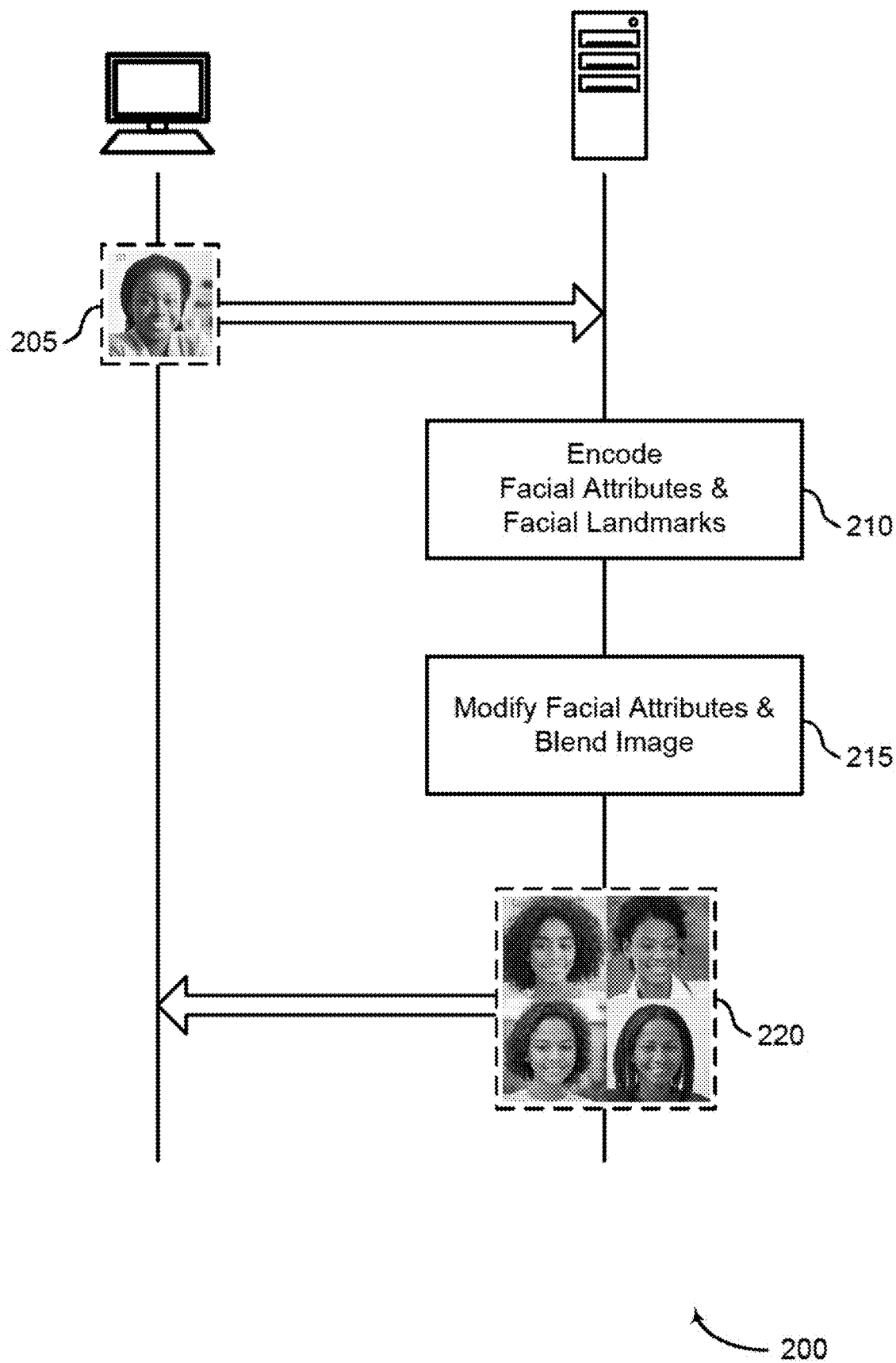
FIG. 2 shows an example of a process for face editing according to aspects of the present disclosure.

FIG. 2 shows an example of a process 200 for face editing according to aspects of the present disclosure. In some examples, these operations are performed by a system including a processor executing a set of codes to control functional elements of an apparatus, such as the image processing apparatus 110 of FIG. 1. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, a user provides image depicting a face. In some cases, the operations of this step refer to, or may be performed by, a user device as described with reference to FIG. 1. For example, a user device may provide an input image of a face (e.g., comprising a plurality of input attributes and a plurality of input facial landmarks) to an image processing apparatus.

At operation 210, the system encodes attributes and landmarks of the face. For example, the system encodes the input image to obtain a joint conditional vector representing the plurality of input attributes and the plurality of input facial landmarks. In some cases, the operations of this step refer to, or may be performed by, an image processing apparatus as described with reference to FIGS. 1 and 4.

At operation 215, the system modifies the attributes. For example, the system may combine the encoded attributes and landmarks with an identity vector (e.g., a vector representing attributes and/or landmarks associated with some identity) to generate a latent vector representing the modified attributes. Additionally or alternatively, the system may decompose the encoded attributes and landmarks into an attribute vector and a landmark vector, and the attribute vector may be modified and recombined with the landmark vector to generate a latent vector representing the modified attributes. In some cases, the operations of this step refer to, or may be performed by, an image processing apparatus as described with reference to FIGS. 1 and 4.

At operation 220, the system provides blended image with modified attributes. For example, the system may generate a modified image based on the modification of attributes at operation 215 (e.g., the system may generate a modified image based on the latent vector generated at operation 215). In some cases, the operations of this step refer to, or may be performed by, an image processing apparatus as described with reference to FIGS. 1 and 4. For instance, the image processing apparatus may blend the modified image, based on the input image, and provide the blended image with modified attributes to the user device.

Figure 3:
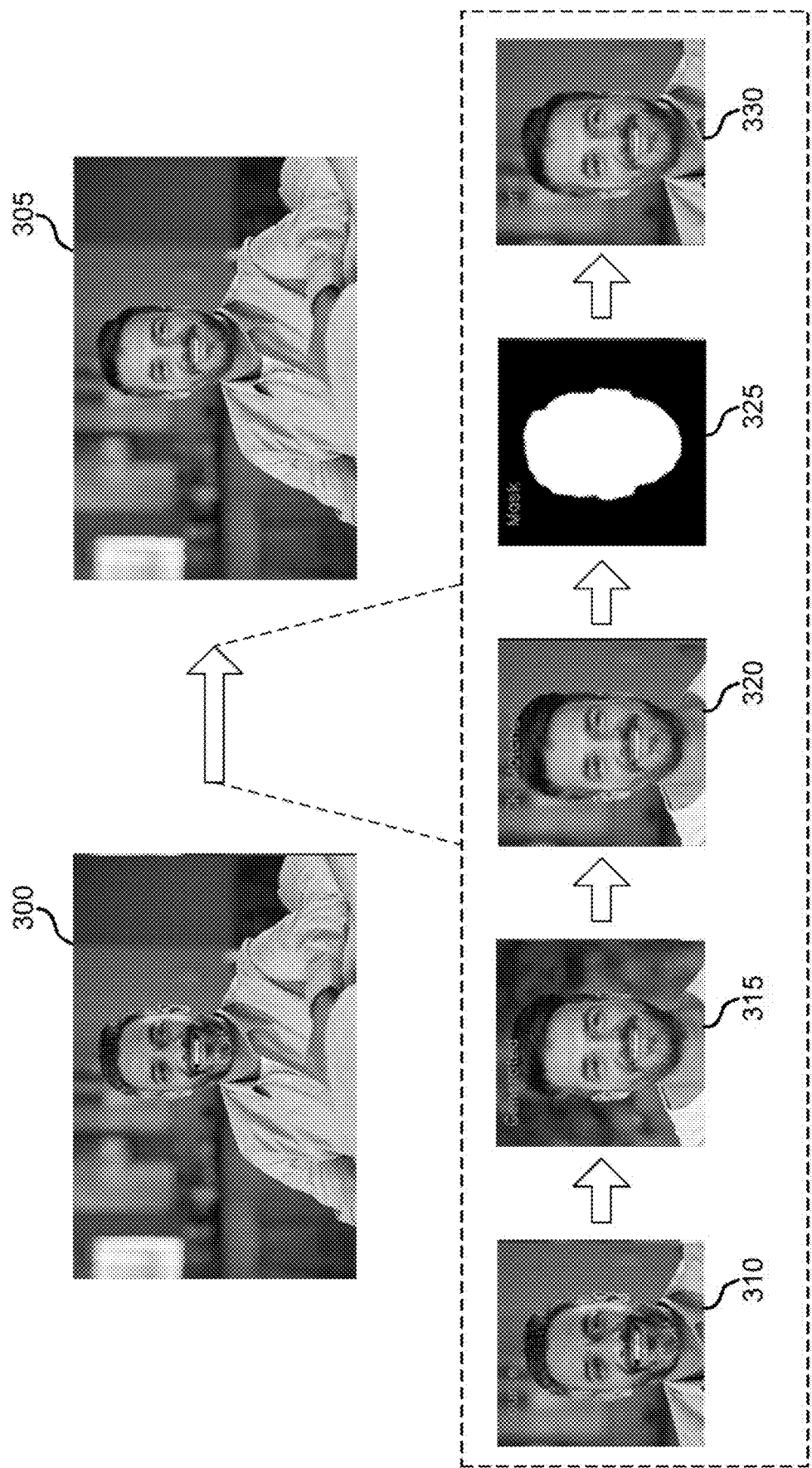
FIG. 3 shows an example of a process of conditional face generation according to aspects of the present disclosure.

FIG. 3 shows an example of a process for conditional face generation according to aspects of the present disclosure. The example shown includes input image 300, modified image 305, input face 310, generated face 315, matched background 320, face mask 325, and blended face 330.

Embodiments of the present disclosure include a face attribute and face landmark conditioning system that modifies an input image 300 (e.g., a source image of an input face 310) based on a specified set of conditions. The face attribute conditioning may include conditioning attributes such as age, skin tone, etc., and face landmark conditioning includes conditioning fiducial landmark points specifying the overall shape of the generated face. In some cases, a conditional generative adversarial network (GAN) is trained using embeddings generated for face attributes and landmark points. For example, a joint conditional vector, which represents attributes and landmarks of an input face 310 in a multi-dimensional vector space, may be varied to provide image variants (e.g., generated faces 315) from the input image 300 (e.g., such as changes in face age, face skin tone, face expression, etc.).

Additionally or alternatively, a variable identity vector may be combined with the joint conditional vector (e.g., which may be a modified joint conditional vector or an unmodified joint conditional vector) to generate visually similar images with a different identity than source image. For instance, identity vectors may be generated to modify attributes (such as age, skin tone, expression, etc.) of an input face 310 to change the facial identity of the input face 310, while maintaining similarity between the generated output image 305 and the original input image 300. As an example, an identity vector may be generated to modify input face 310 to generate a generated face 315, such that a face in output image 305 appears to have a different identity from the face in the input source image 300 (e.g., such that people in an input image 300 may remain anonymous in a generated output image 305 by changing or randomizing the identity of generated faces 315). For instance, an identity vector may be used to generate a generated face 315 with a similar expression as, but different identify from, the input face 310.

In some examples, the generated faces 315 are warped to the original input image 300 (e.g., to match the background of input image 300 and generated output image 305). For example, some embodiments described herein may include processing matched background 320, generated face mask 325, and blending matched background 320 and generated face mask 325 to generate blended face 330 for the output image 305.

For instance, in some cases, generated faces 315 may not be conditioned on the image background, which may result in various random backgrounds. Accordingly, background matching techniques (e.g., portrait segmentation and inpainting techniques) may be implemented to generate matched background 320. Further, blending techniques may be implemented (e.g., using a GAN, such as HydraGAN techniques) to generate blended face 330 for the output image 305. Accordingly, an output image 305 may include generated face 315 that appears in the same context (e.g., the same background, clothing, etc.) as input face 310 in the input image 300.

In some aspects, image processing techniques may include image segmentation, which may include partitioning input image 300 into multiple segments (sets of pixels, also known as image objects). In digital imaging, a pixel (or picture element) refers to the smallest addressable element in a display device, and the smallest controllable element of a picture represented on the device. In some cases, each pixel may represent a sample of an original image. The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics. For instance, input face 310 may be partitioned into a matched background 320 and a generating face mask 325.

In some examples, an object detection network is used to classify objects using categorical labels and localize objects present in input images 300. Object detection can be performed and evaluated by mean average precision, a metric taking into account a quality of classification and localization. For example, object detection techniques may be implemented to detect and analyze input face 310 from an input image 300 (e.g., such that the input face 310 may be processed, modified, etc., according to the techniques described herein).

Network Architecture

Figure 4:
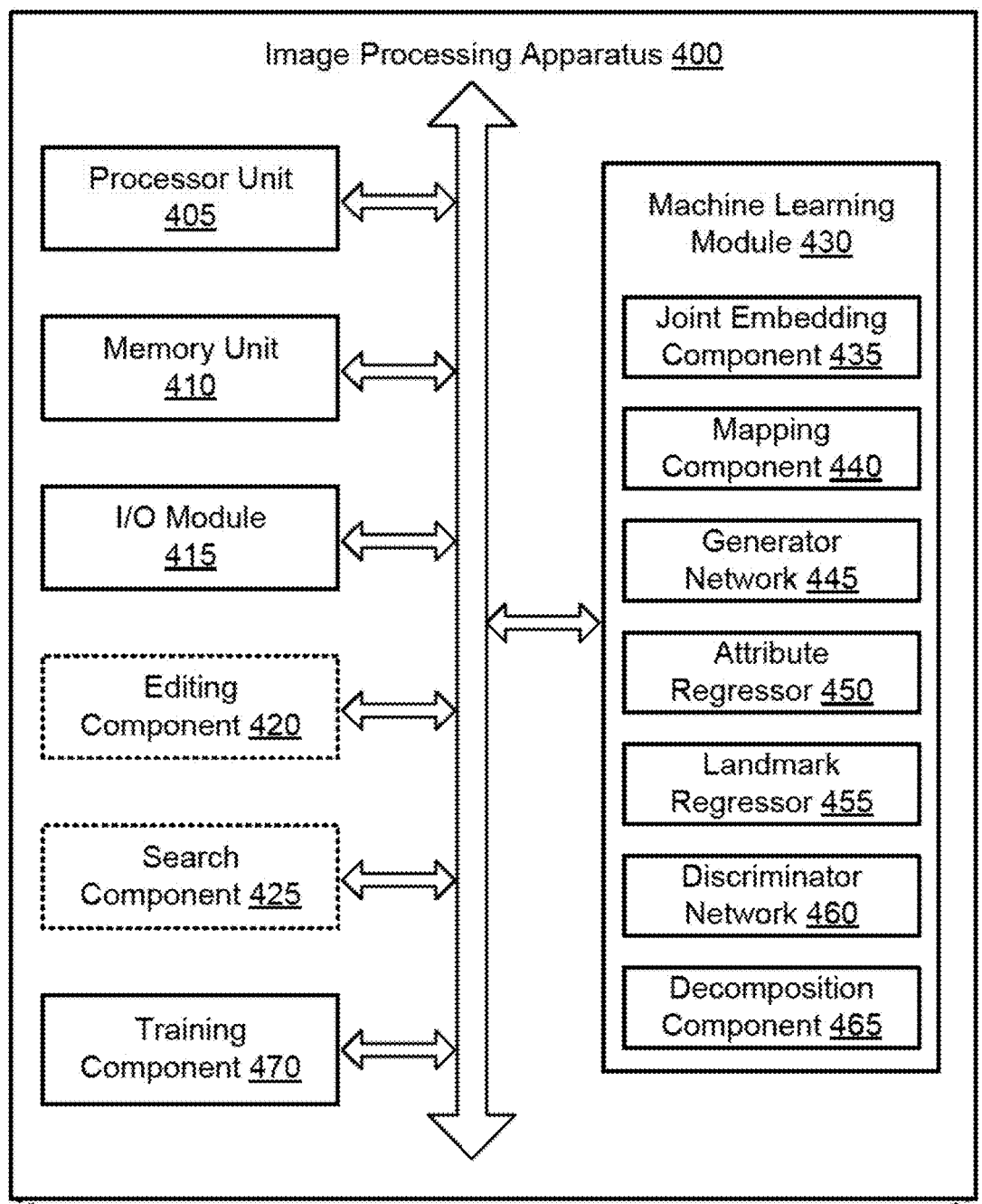
FIG. 4 shows an example of an image processing apparatus according to aspects of the present disclosure.

FIG. 4 shows an example of an image processing apparatus 400 according to aspects of the present disclosure. Image processing apparatus 400 is an example of, or includes aspects of, the corresponding element described with reference to FIG. 1. In one aspect, image processing apparatus 400 includes processor unit 405, memory unit 410, I/O module 415, editing component 420, search component 425, machine learning module 430, and training component 470. In one aspect, machine learning module 430 includes joint embedding component 435, mapping component 440, generator network 445, attribute regressor 450, landmark regressor 455, discriminator network 460, and decomposition component 465.

An apparatus, system, and method for high resolution conditional face generation is described. One or more aspects of the apparatus, system, and method include a joint embedding component 435 configured to receive an input image of a face comprising a plurality of input attributes and a plurality of input facial landmarks and to encode the image to obtain a joint conditional vector representing the plurality of input attributes and the plurality of input facial landmarks. The joint embedding component 435 is trained to encode the plurality of input attributes and the plurality of input facial landmarks using an attribute loss and a landmark loss. One or more aspects of the apparatus, system, and method further include a mapping component 440 configured to generate a latent vector based on the joint conditional vector and a generator network 445 configured to generate a modified image based on the latent vector. For example, at training time, the attribute loss can be computed based on a difference between an input attribute and a regressor predicted attribute Some examples of the apparatus, system, and method further include an attribute regressor 450 configured to generate an attribute vector representing the plurality of input attributes (e.g., where the attribute loss is based on the attribute regressor) and a landmark regressor 455 configured to generate a landmark vector representing the plurality of input facial landmarks (e.g., where the landmark loss is based on the landmark regressor).

Some examples of the apparatus, system, and method further include a discriminator network 460 configured to determine whether an image is generated by the generator network (e.g., where the generator network is trained based on the discriminator network) and a decomposition component 465 configured to decompose the joint conditional vector to obtain an attribute vector and landmark vector.

A processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor unit 405. In some cases, the processor unit 405 is configured to execute computer-readable instructions stored in a memory to perform various functions. In some embodiments, a processor unit 405 includes special purpose components for modem processing, baseband processing, digital signal processing, or transmission processing.

Examples of a memory unit 410 include random access memory (RAM), read-only memory (ROM), or a hard disk. Examples of memory units 410 include solid state memory and a hard disk drive. In some examples, memory unit 410 is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

An I/O module 415 (e.g., an IO controller) may manage input and output signals for a device. I/O module 415 may also manage peripherals not integrated into a device. In some cases, an I/O module 415 may represent a physical connection or port to an external peripheral. In some cases, an I/O module 415 may utilize an operating system such as iOS®, ANDROID®, MS-DOS®, MS-WINDOWS®, OS/2®, UNIX®, LINUX®, or another known operating system. In other cases, an I/O module 415 may represent or interact with a modem, a keyboard, a mouse, a touchscreen, or a similar device. In some cases, an I/O module 415 may be implemented as part of a processor. In some cases, a user may interact with a device via IO controller or via hardware components controlled by an I/O module 415.

In some examples, a machine learning module 430 may include a neural processing unit (NPU) is a microprocessor that specializes in the acceleration of machine learning algorithms. For example, machine learning module 430 (e.g., and/or subcomponents of machine learning module 430) may operate on predictive models such as artificial neural networks (ANNs) or random forests (RFs). In some cases, a machine learning module 430 is designed in a way that makes it unsuitable for general purpose computing such as that performed by a CPU or processor unit 405. Additionally or alternatively, the software support for a machine learning module 430 may not be developed for general purpose computing.

Machine learning module 430 may implement an artificial neural network (ANN) such as a convolutional neural network (CNN). A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, a training component 470 is used to train the encoder of the image processing apparatus 400. A loss function is used during the training and the parameters of the encoder are iteratively updated based on comparison. After training, the trained encoder is used to encode the image to obtain a joint conditional vector representing the plurality of input attributes and the plurality of input facial landmarks. Training the encoder will be described in greater detail herein, for example, with reference to FIGS. 8-10.

In some aspects, image processing apparatus 400 may implement software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

According to some aspects, editing component 420 receives an edit command that indicates a change to an attribute of the set of attributes. In some examples, editing component 420 modifies the attribute vector based on the edit command. In some examples, editing component 420 combines the modified attribute vector with the landmark vector to obtain a modified joint conditional vector, where the latent vector is based the combined modified joint conditional vector. In some examples, editing component 420 modifies the latent vector, where the modified image differs from the input image based on the modification. In some examples, editing component 420 generates a face mask indicating a location of the face in the input image. In some examples, editing component 420 replaces the face in the input image with a modified face from the modified image based on the face mask. In some examples, editing component 420 generates a set of modified facial landmark vectors corresponding to a set of image frames, where the set of modified facial landmark vectors correspond to a motion of a face in the image. In some examples, editing component 420 generates a video depicting the motion of the face in the image by combining the set of modified images.

According to some aspects, search component 425 receives an image search query, where the input image is obtained from the image search query and the modified image includes a generative search result for the image search query.

Joint embedding component 435 is an example of, or includes aspects of, the corresponding element described with reference to FIG. 5. According to some aspects, joint embedding component 435 receives an input image of a face including a set of input attributes and a set of input facial landmarks. In some examples, joint embedding component 435 encodes the image to obtain a joint conditional vector representing the set of input attributes and the set of input facial landmarks using a joint embedding component 435, where the joint embedding component 435 is trained to encode the set of input attributes and the set of input facial landmarks using an attribute loss and a landmark loss. In some examples, joint embedding component 435 generates a set of joint conditional vectors corresponding the set of modified facial landmark vectors. According to some aspects, joint embedding component 435 receives an input image of a face comprising a plurality of input attributes and a plurality of input facial landmarks and to encode the image to obtain a joint conditional vector representing the plurality of input attributes and the plurality of input facial landmarks using a joint embedding component 435.

Mapping component 440 is an example of, or includes aspects of, the corresponding element described with reference to FIG. 5. According to some aspects, mapping component 440 generates a latent vector based on the joint conditional vector. In some examples, mapping component 440 identifies an identity vector representing an identity of the face in the image. In some examples, mapping component 440 combines the identity vector with the joint conditional vector to obtain the latent vector.

Generator network 445 is an example of, or includes aspects of, the corresponding element described with reference to FIGS. 5 and 10. According to some aspects, generator network 445 generates a modified image (e.g., having a set of desired attributes) based on the latent vector. In some examples, generator network 445 modifies the identity vector, where the latent vector is based on the modified identity vector and the modified image represents an identity different from an identity of the face in the image. In some examples, generator network 445 generates a noise vector, where the modified image is generated based on the noise vector. In some examples, generator network 445 generates a set of generative search results for a search query based on the joint conditional vector.

Attribute regressor 450 is an example of, or includes aspects of, the corresponding element described with reference to FIG. 9. According to some aspects, attribute regressor 450 applies attribute regression to the training image to obtain an input attribute vector representing the set of input attributes. According to some aspects, an attribute loss is based on the attribute regressor 450.

Landmark regressor 455 is an example of, or includes aspects of, the corresponding element described with reference to FIG. 9. According to some aspects, landmark regressor 455 applies landmark regression to the training image to obtain an input landmark vector representing the set of input facial landmarks. According to some aspects, a landmark loss is based on the landmark regressor 455.

Discriminator network 460 is an example of, or includes aspects of, the corresponding element described with reference to FIG. 10. According to some aspects, discriminator network 460 determines whether the modified image is a generated image or an original image. According to some aspects, discriminator network 460 is configured to determine whether an image is generated by the generator network 445, wherein the generator network 445 is trained based on the discriminator network 460.

According to some aspects, decomposition component 465 decomposes the joint conditional vector to obtain an attribute vector representing the set of input attributes and a landmark vector representing the set of input facial landmarks.

According to some aspects, training component 470 receives a training image of a face including a set of input attributes and a set of input facial landmarks. In some examples, training component 470 computes an attribute loss by comparing attributes of the modified image to the set input attributes. In some examples, training component 470 computes a landmark loss by comparing facial landmarks of the modified image to the set of input facial landmarks. In some examples, training component 470 updates parameters of the joint embedding component 435 based on the attribute loss and the landmark loss.

In some examples, training component 470 applies the attribute regressor 450 to the modified image to obtain a predicted attribute vector representing the attributes of the modified image, where the attribute loss is based on a difference between the input attribute vector and the predicted attribute vector. In some examples, training component 470 applies the landmark regressor 455 to the modified image to obtain a predicted landmark vector representing the facial landmarks of the modified image, where the landmark loss is based on a difference between the input landmark vector and the predicted landmark vector.

In some examples, training component 470 computes a generative loss based on the determination, where the parameters of the joint embedding component 435 are updated based on the generative loss. In some examples, training component 470 trains a generator network 445 and a discriminator network 460 during a first training phase without the conditional vector training. In some examples, training component 470 introduces joint conditional vector training progressively during a second training phase.

Figure 5:
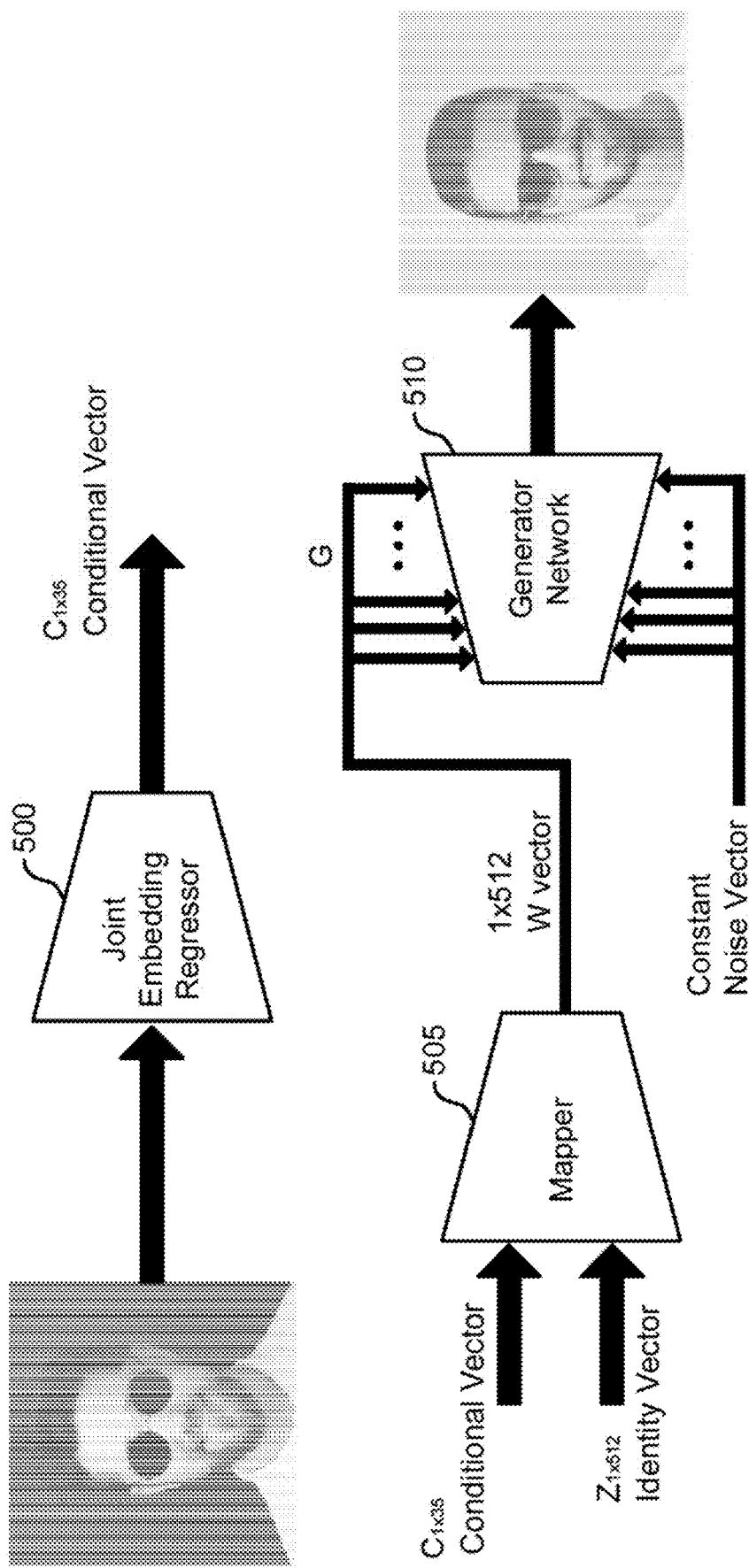
FIG. 5 shows an example of an image editing pipeline according to aspects of the present disclosure.

FIG. 5 shows an example of an image editing pipeline according to aspects of the present disclosure. The example shown includes joint embedding component 500, mapping component 505, and generator network 510. Joint embedding component 500 and mapping component 505 are examples of, or includes aspects of, the corresponding elements described with reference to FIG. 4. Generator network 510 is an example of, or includes aspects of, the corresponding element described with reference to FIGS. 4 and 10.

In some cases, a joint regressor (e.g., joint embedding component 500) predicts conditional embedding (e.g., joint conditional vector, $C_{1\times35}$), and multiple similar images are generated by sampling Z which is a random vector from a gaussian distribution. That is, multiple similar images (e.g., with modified or anonymized faces) can be generated by combining the joint conditional vector ($C_{1\times35}$) and a random identity vector (e.g., identity vector, $Z_{1\times512}$). A joint landmark or attribute regressor (e.g., joint embedding component 500) is trained using data (e.g., data X) to increase the speed of the inference (e.g., as described in more detail herein, for example, with reference to FIGS. 8-10).

The inference pipeline provides editability in multiple places, for example, editing joint conditional vectors (C vectors) and latent vectors (e.g., latent vector, $W_{1\times512}$). For example, editing joint conditional vectors (C) includes decomposition of joint conditional vectors (C) to attribute vectors (A) and landmark vectors (L). The attribute and landmark vectors may be changed to generate variants by fixing identity vector (Z). In some examples, the age attribute may be modified to generate variants of a facial image. Alternatively joint conditional vectors (C) can be fixed to generate multiple visually similar images by varying identity vector (Z). Additionally, editing latent vector (W) vector involves GAN editing.

Accordingly, a method, apparatus, non-transitory computer readable medium, and system for high resolution conditional face generation is described. One or more aspects of the method, apparatus, non-transitory computer readable medium, and system include receiving an input image (e.g., a 256×256 pixel source image) of a face comprising a plurality of input attributes and a plurality of input facial landmarks, and encoding the image to obtain a joint conditional vector (C) representing the plurality of input attributes and the plurality of input facial landmarks using a joint embedding component 500, wherein the joint embedding component 500 is trained to encode the plurality of input attributes and the plurality of input facial landmarks using an attribute loss and a landmark loss. One or more aspects of the method, apparatus, non-transitory computer readable medium, and system further include generating a latent vector (W) based on the joint conditional vector (C) and generating a modified image (e.g., a 1024×1024 pixel output image) based on the latent vector (W). For instance, mapping component 505 may generate the latent vector (W) and generator network 510 may generate the modified image based on the generated latent vector (W).

Some examples of the method, apparatus, non-transitory computer readable medium, and system further include identifying an identity vector (Z) representing an identity of the face in the image. Some examples further include combining the identity vector (Z) with the joint conditional vector (C) to obtain the latent vector (W). Some examples of the method, apparatus, non-transitory computer readable medium, and system further include modifying the identity vector (Z), wherein the latent vector (W) is based on the modified identity vector and the modified image represents an identity different from an identity of the face in the image. Some examples of the method, apparatus, non-transitory computer readable medium, and system further include generating a noise vector (e.g., Constant Noise Vector), wherein the modified image is generated based on the noise vector.

Some examples of the method, apparatus, non-transitory computer readable medium, and system further include decomposing the joint conditional vector (C) to obtain an attribute vector representing the plurality of input attributes and a landmark vector representing the plurality of input facial landmarks. Some examples further include receiving an edit command that indicates a change to an attribute of the plurality of attributes. Some examples further include modifying the attribute vector based on the edit command. Some examples further include combining the modified attribute vector with the landmark vector to obtain a modified joint conditional vector, wherein the latent vector (W) is based the combined modified joint conditional vector.

Some examples of the method, apparatus, non-transitory computer readable medium, and system further include modifying the latent vector (W), wherein the modified image differs from the input image based on the modification. Generative search refers to generation of results based on the search. In some cases, dynamic face generation may be performed. Some examples of the method, apparatus, non-transitory computer readable medium, and system further include receiving an image search query, wherein the input image is obtained from the image search query and the modified image comprises a generative search result for the image search query.

Some examples of the method, apparatus, non-transitory computer readable medium, and system further include generating a plurality of generative search results based on the joint conditional vector (C). Some examples of the method, apparatus, non-transitory computer readable medium, and system further include generating a face mask indicating a location of the face in the input image. Some examples further include replacing the face in the input image with a modified face from the modified image based on the face mask.

Some examples of the method, apparatus, non-transitory computer readable medium, and system further include generating a plurality of modified facial landmark vectors corresponding to a plurality of image frames, wherein the plurality of modified facial landmark vectors correspond to a motion of the face in the image. Some examples further include generating a plurality of joint conditional vectors corresponding the plurality of modified facial landmark vectors. Some examples further include generating a plurality of modified images corresponding to the plurality of joint conditional vectors. Some examples further include generating a video depicting the motion of the face in the image by combining the plurality of modified images.

It should be noted that joint conditional vector (C), identity vector (e.g., Z), and latent vector (W) are shown as having dimensions $C_{1\times35}$, $Z_{1\times512}$, and $W_{1\times512}$, respectively, for illustrative purposes only, and are not intended to be limiting in terms of the scope of the present disclosure. Other vector representations of other dimensions are possible by analogy.

Inference

Figure 6:
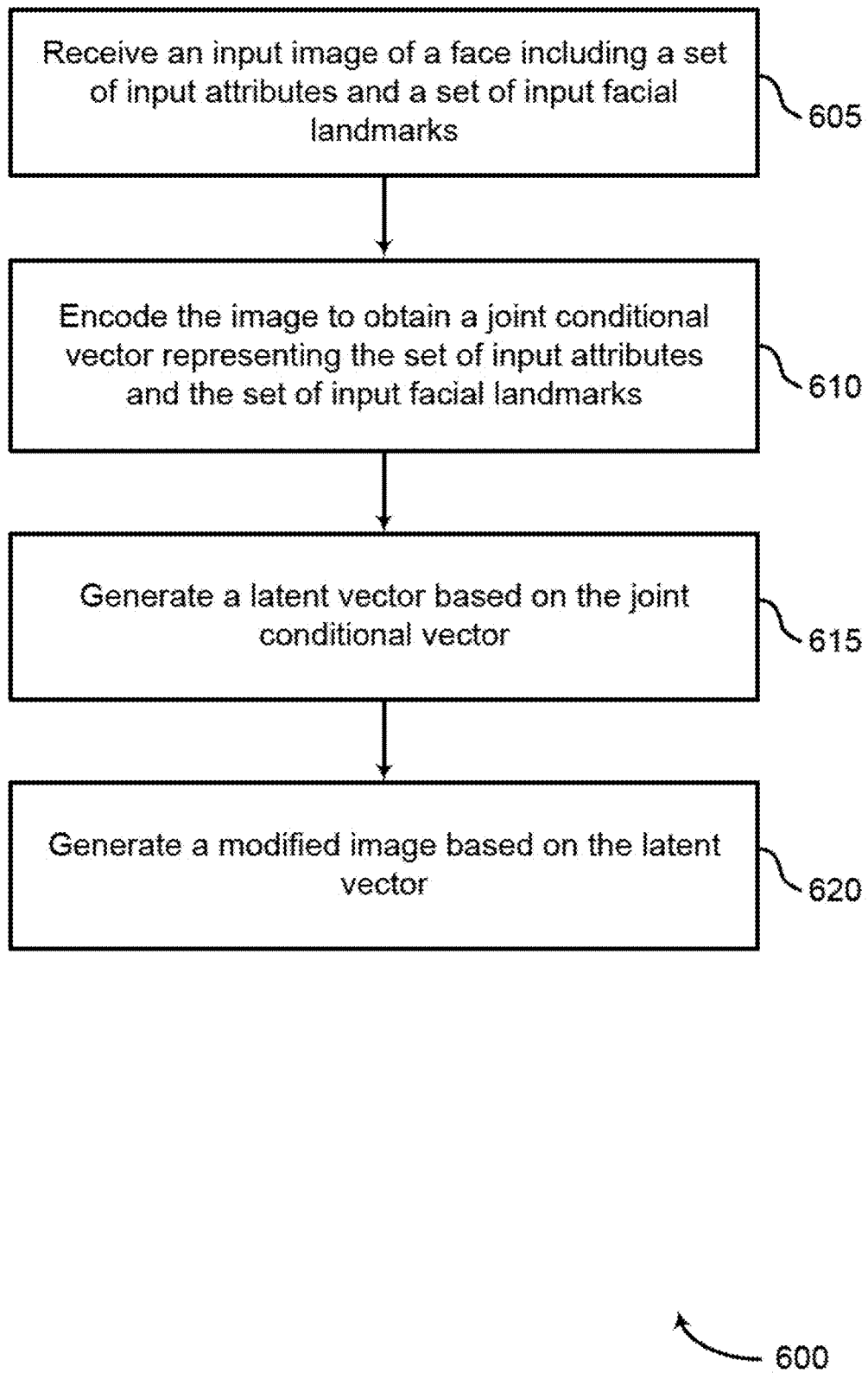
FIG. 6 shows an example of a method for image processing according to aspects of the present disclosure.

FIG. 6 shows an example of a method 600 for image processing according to aspects of the present disclosure. The method 600 can be applied at inference time to generate a modified image based on an input image. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives an input image of a face including a set of input attributes and a set of input facial landmarks. For example, the system may perform object detection techniques to identify an input face included in an input image and generate a face mask indicating a location of the face in the input image (e.g., as further described herein, for example, with reference to FIG. 3). In some cases, the operations of this step refer to, or may be performed by, a joint embedding component as described with reference to FIGS. 4 and 5.

At operation 610, the system encodes the image to obtain a joint conditional vector representing the set of input attributes and the set of input facial landmarks. In some cases, the operations of this step refer to, or may be performed by, a joint embedding component as described with reference to FIGS. 4 and 5. For instance, a joint embedding component may be trained to encode the set of input attributes and the set of input facial landmarks using an attribute loss and a landmark loss (e.g., as further described herein, for example, with reference to FIG. 9).

At operation 615, the system generates a latent vector based on the joint conditional vector. In some cases, the operations of this step refer to, or may be performed by, a mapping component as described with reference to FIGS. 4 and 5. In some examples, the system may decompose the joint conditional vector into an attribute vector and a landmark vector, modify the attribute vector, and combine the modified attribute vector and the landmark vector to generate the latent vector. Additionally or alternatively, the system may combine an identity vector with the conditional joint vector to generate the latent vector (e.g., where the conditional joint vector may be the original unmodified encoded conditional joint vector or a decomposed, modified, and recomposed conditional joint vector).

At operation 620, the system generates a modified image based on the latent vector. In some cases, the operations of this step refer to, or may be performed by, a generator network as described with reference to FIGS. 4, 5, and 10. For example, the system may decode the latent vector representation of the modified source image to generate (e.g., and display) the modified image.

Figure 7:
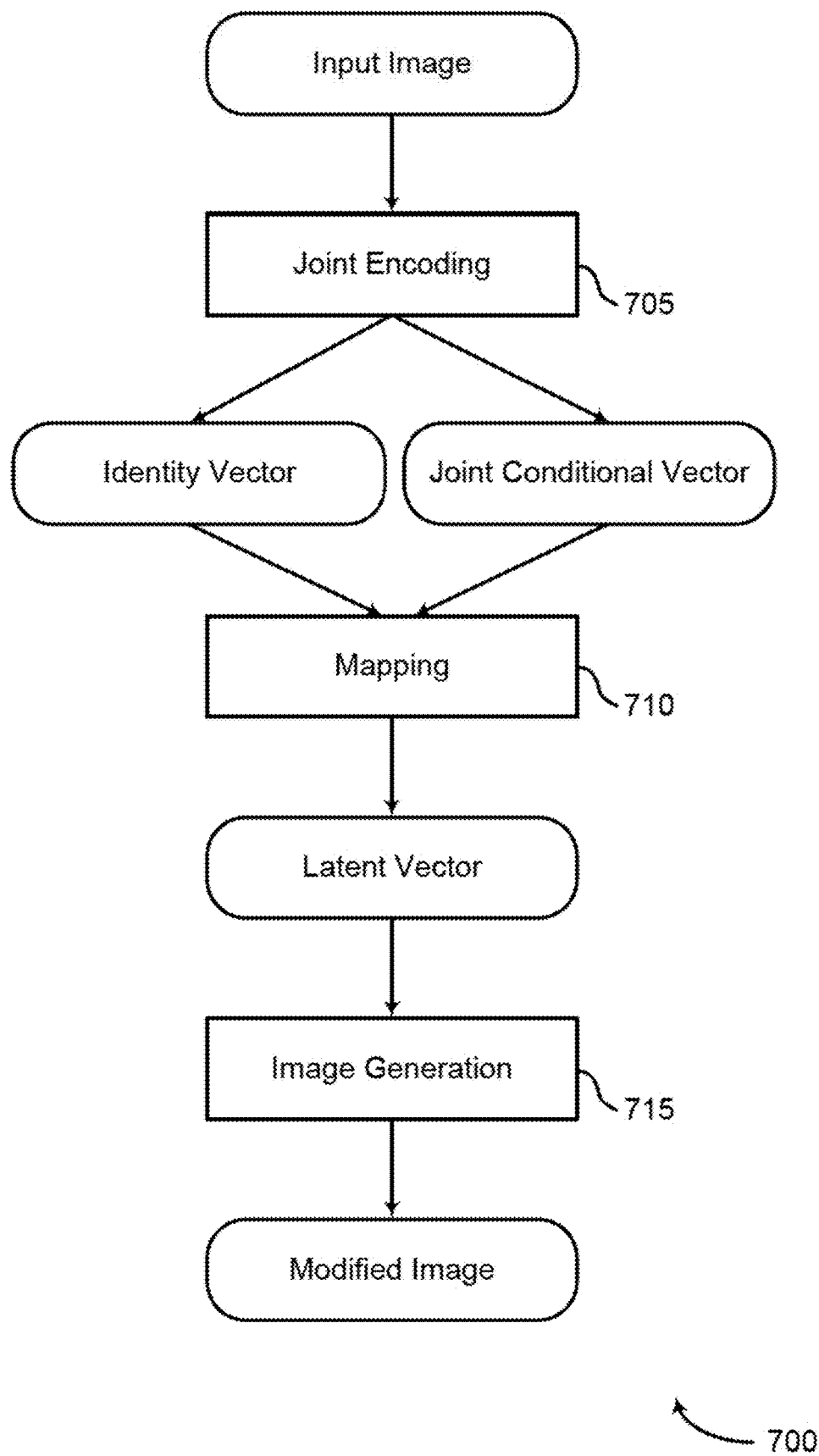
FIG. 7 shows an example of an inference flowchart according to aspects of the present disclosure.

FIG. 7 shows an example of an inference flowchart 700 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system performs joint encoding on the input image to obtain a joint conditional vector. In some cases, the input image is also encoded to obtain an identity vector. In other examples, the identity vector is selected randomly. For example, the system encodes an input image of a face including a set of input attributes and a set of input facial landmarks to obtain the joint conditional vector, where the joint conditional vector represents the set of input attributes and the set of input facial landmarks. The joint encoding can be performed by a machine learning model trained using an attribute loss and a landmark loss. In some cases, the operations of this step refer to, or may be performed by, a joint embedding component as described with reference to FIGS. 4 and 5.

At operation 710, the system maps the joint conditional vector into a latent space for image generation. In some cases, the system generates a latent vector based on the joint conditional vector and an identity vector for the input image. In some cases, the operations of this step refer to, or may be performed by, a mapping component as described with reference to FIGS. 4 and 5.

At operation 715, the system generates a modified image based on the latent vector. For example, the modified image can be generated using a GAN. In some cases, the operations of this step refer to, or may be performed by, a generator network as described with reference to FIGS. 4, 5, and 10.

Training and Evaluation

Figure 8:
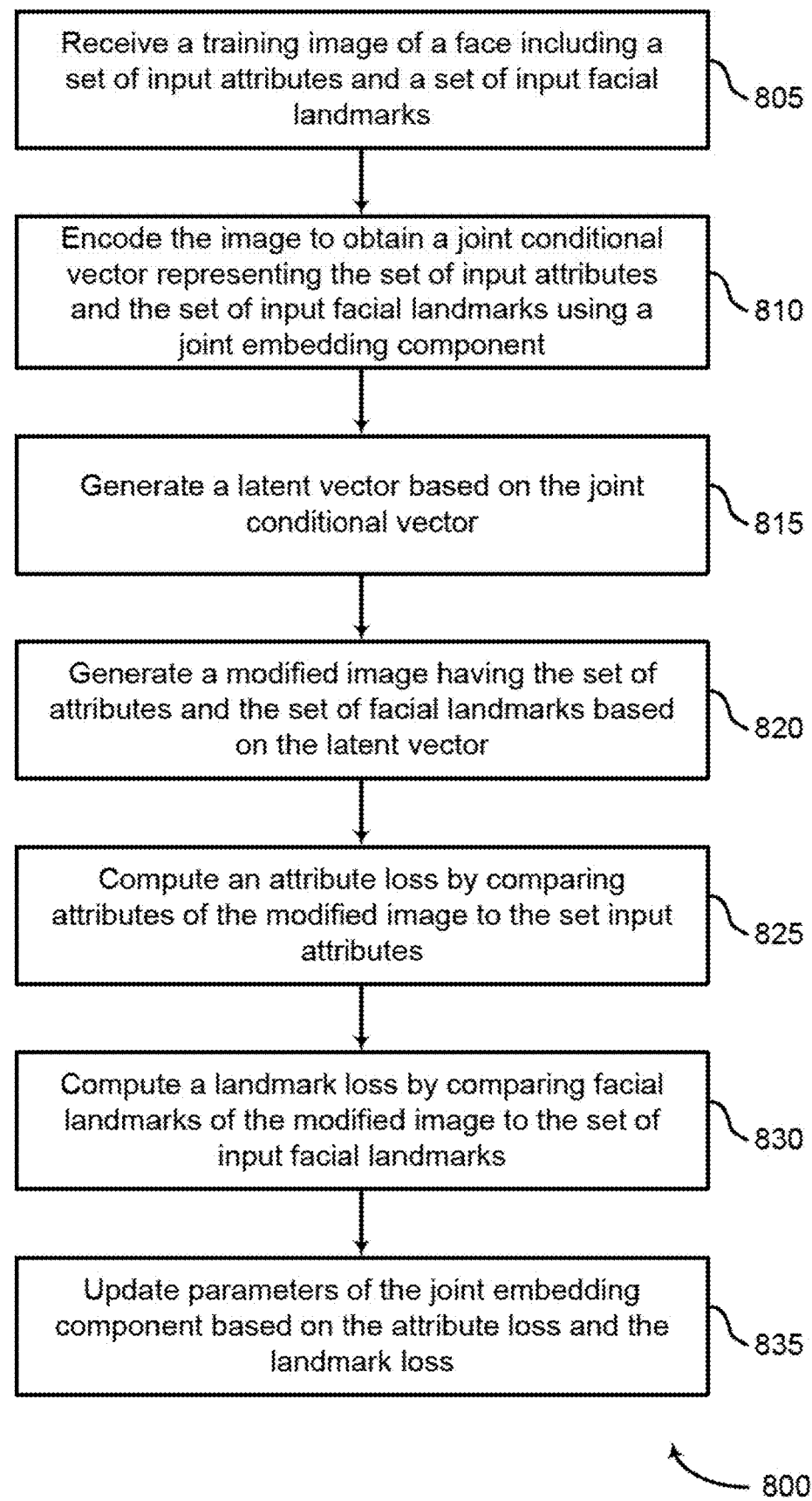
FIG. 8 shows an example of a method for training a neural network according to aspects of the present disclosure.

FIG. 8 shows an example of a method 800 for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method and system for high resolution conditional face generation is described. One or more aspects of the method and system include receiving a training image of a face comprising a plurality of input attributes and a plurality of input facial landmarks; encoding the image to obtain a joint conditional vector representing the plurality of input attributes and the plurality of input facial landmarks using a joint embedding component; generating a latent vector based on the joint conditional vector; generating a modified image having the plurality of attributes and the plurality of facial landmarks based on the latent vector; computing an attribute loss by comparing attributes of the modified image to the plurality input attributes; computing a landmark loss by comparing facial landmarks of the modified image to the plurality of input facial landmarks; and updating parameters of the joint embedding component based on the attribute loss and the landmark loss.

At operation 805, the system receives a training image of a face including a set of input attributes and a set of input facial landmarks. For example, the (input attributes and the input facial landmarks can be ground truth information). In some cases, the operations of this step refer to, or may be performed by, a training component as described with reference to FIG. 4.

At operation 810, the system encodes the image to obtain a joint conditional vector representing the set of input attributes and the set of input facial landmarks using a joint embedding component. In some cases, the operations of this step refer to, or may be performed by, a joint embedding component as described with reference to FIGS. 4 and 5.

At operation 815, the system generates a latent vector based on the joint conditional vector. In some cases, the operations of this step refer to, or may be performed by, a mapping component as described with reference to FIGS. 4 and 5.

At operation 820, the system generates a modified image having the set of attributes and the set of facial landmarks based on the latent vector. In some cases, the operations of this step refer to, or may be performed by, a generator network as described with reference to FIGS. 4, 5, and 10.

At operation 825, the system computes an attribute loss by comparing attributes of the modified image to the set input attributes (e.g., the ground truth information). In some cases, the operations of this step refer to, or may be performed by, a training component as described with reference to FIG. 4.

At operation 830, the system computes a landmark loss by comparing facial landmarks of the modified image to the set of input facial landmarks (e.g., the ground truth information). In some cases, the operations of this step refer to, or may be performed by, a training component as described with reference to FIG. 4.

At operation 835, the system updates parameters of the joint embedding component based on the attribute loss and the landmark loss. In some cases, the operations of this step refer to, or may be performed by, a training component as described with reference to FIG. 4. \

Some examples of the method and system further include applying an attribute regressor to the training image to obtain an input attribute vector representing the plurality of input attributes. Some examples further include applying the attribute regressor to the modified image to obtain a predicted attribute vector representing the attributes of the modified image, wherein the attribute loss is based on a difference between the input attribute vector and the predicted attribute vector.

Some examples of the method and system further include applying a landmark regressor to the training image to obtain an input landmark vector representing the plurality of input facial landmarks. Some examples further include applying the landmark regressor to the modified image to obtain a predicted landmark vector representing the facial landmarks of the modified image, wherein the landmark loss is based on a difference between the input landmark vector and the predicted landmark vector.

Some examples of the method and system further include determining whether the modified image is a generated image or an original image using a discriminator network. Some examples further include computing a generative loss based on the determination, wherein the parameters of the joint embedding component are updated based on the generative loss. Some examples of the method and system further include training a generator network and the discriminator network during a first training phase without the conditional vector training. Some examples further include introducing joint conditional vector training progressively during a second training phase.

Figure 9:
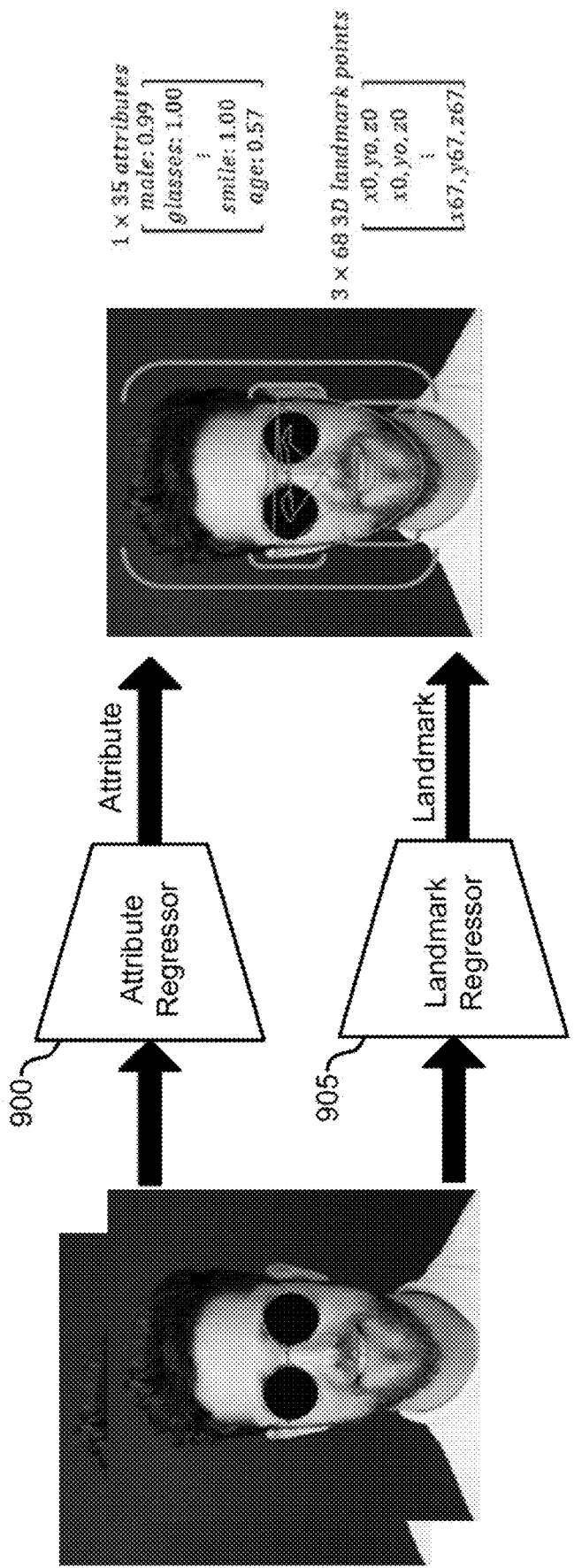
FIG. 9 shows an example of a method for obtaining an attribute vector and a landmark vector according to aspects of the present disclosure.

FIG. 9 shows an example of a process for obtaining an attribute vector and a landmark vector according to aspects of the present disclosure. The example shown includes attribute regressor 900 and landmark regressor 905. Attribute regressor 900 is an example of, or includes aspects of, the corresponding element described with reference to FIG. 4. Landmark regressor 905 is an example of, or includes aspects of, the corresponding element described with reference to FIG. 4.

Conditional face generation refers to generation of faces satisfying a specified set of conditions. Two kinds of conditioning signals, i.e., face attribute conditioning and face landmark conditioning, enable example based synthetic face generation and editing. In some cases, face attribute conditioning is a set of face attributes (e.g., age, expression, skin tone, etc.) used to specify the generated synthetic image. Face landmark conditioning is a set of fiducial landmark points specifying the overall shape of the generated face. As an example, face attribute conditioning may include conditioning 35 face attributes and face landmark conditioning may include conditioning 68 landmark points.

For instance, a dataset $X_{raw}$ is a 100 K×239 data matrix with 100K rows (i.e., data points) and 35 columns (i.e., variables or features). A centered data matrix X is obtained after subtracting the mean vector μ from each row. Let V be a 239×35 matrix of top 35 eigenvectors (i.e., eigenvectors with maximum values) to be used. Next, a 100 K×35 matrix of PCA projections (i.e., scores) is given by Z=XV. Thus, a training dataset of 100K images is created. Each image is represented by a compact face attribute or landmark embedding of size 1×35 vector. In some cases, multiple attributes are interrelated resulting which may result in more efficient capturing by the embedding (e.g., a vector representation of the interrelated attributes may be encoded more efficiently).

An example embodiment of the present disclosure includes training of the image editing network based on input images. In some examples, 100K images of size 256×256 may be provided for training. An attribute regressor enables identification of an attribute vector A and a landmark regressor enables identification of landmark vectors L. For example, 100K images may generate a matrix of attribute vector A of size (100K×35) and landmark vector L of size (100K×3×68).

$$1 \times 35 \text{ attributes} \begin{bmatrix} \text{male: } 0.99 \\ \text{glasses: } 1.00 \\ \vdots \\ \text{smile: } 1.00 \\ \text{age: } 0.57 \end{bmatrix}.$$

As a result, the matrix of attributes is given as:

$$3 \times 68 \text{ } 3D \text{ landmark points} \begin{bmatrix} x0, y0, z0 \\ x0, y0, z0 \\ \vdots \\ x67, y67, z67 \end{bmatrix}.$$

Similarly, a matrix of landmark points is given as:

Consider $X_{raw}$=concat(L,A) where $X_{raw}$ is the row data concatenating attribute and landmark matrix of size 100 K×239. X is a balanced dataset subtracting the mean such that X=$X_{raw}$−mean($X_{raw}$). V is a 239×35 matrix of top 35 eigenvectors such that V=PCA(X). Finally, the training dataset Z of size 100 K×35 corresponding to 100K images is obtained as Z=XV.

As described herein, a conditioning signal (e.g., a joint conditional vector) is initially regressed from an input image and can be further edited to generate different types of faces. For instance, a machine learning model (e.g., a joint embedding component of a machine learning model) is trained to encode an input image to represent the image in a three-dimensional vector space. Specifically, the machine learning model is trained to encode attributes and facial landmarks of an input image (e.g., to obtain a joint conditional vector representing the input attributes and the input facial landmarks) using an attribute loss and a landmark loss. For example, an attribute regressor 900 may be configured to generate an attribute vector representing the plurality of input attributes (e.g., where the attribute loss is based on the attribute regressor) and a landmark regressor 905 may be configured to generate a landmark vector representing the plurality of input facial landmarks (e.g., where the landmark loss is based on the landmark regressor). For instance, at training time, attribute loss may be computed between the input attribute and the attribute regressor 900 predicted attribute.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

An embodiment of the disclosure includes computation of losses used in training. An attribute loss is given as $|att_{src}-att_{dst}|$ and a landmark loss is given as $|lm_{src}-lm_{dst}|$. In some cases, a GAN loss is computed which ensures that the generated images are realistic. In some examples, the process of decomposition and recomposition includes decomposing and reconstruction of the conditional vector into attributes and landmark points. For example, f(c)=lm, att is a PCA decomposition function. In some cases, a dataset C is generated by performing decomposition based on landmark and attribute points such that PCA(LM,ATT)→C.

The process of generating video content from a still image includes capturing each frame of a driving video such that $lm_1, lm_2, \ldots, lm_n$ is computed. Next, frames are conditionally generated using pairs for new face attribute. In some cases, the pairs may be given as $(att_{new}, lm_1), (att_{new}, lm_2), \ldots (att_{new}, lm_n)$ for the new face attribute $att_{new}$.

Figure 10:
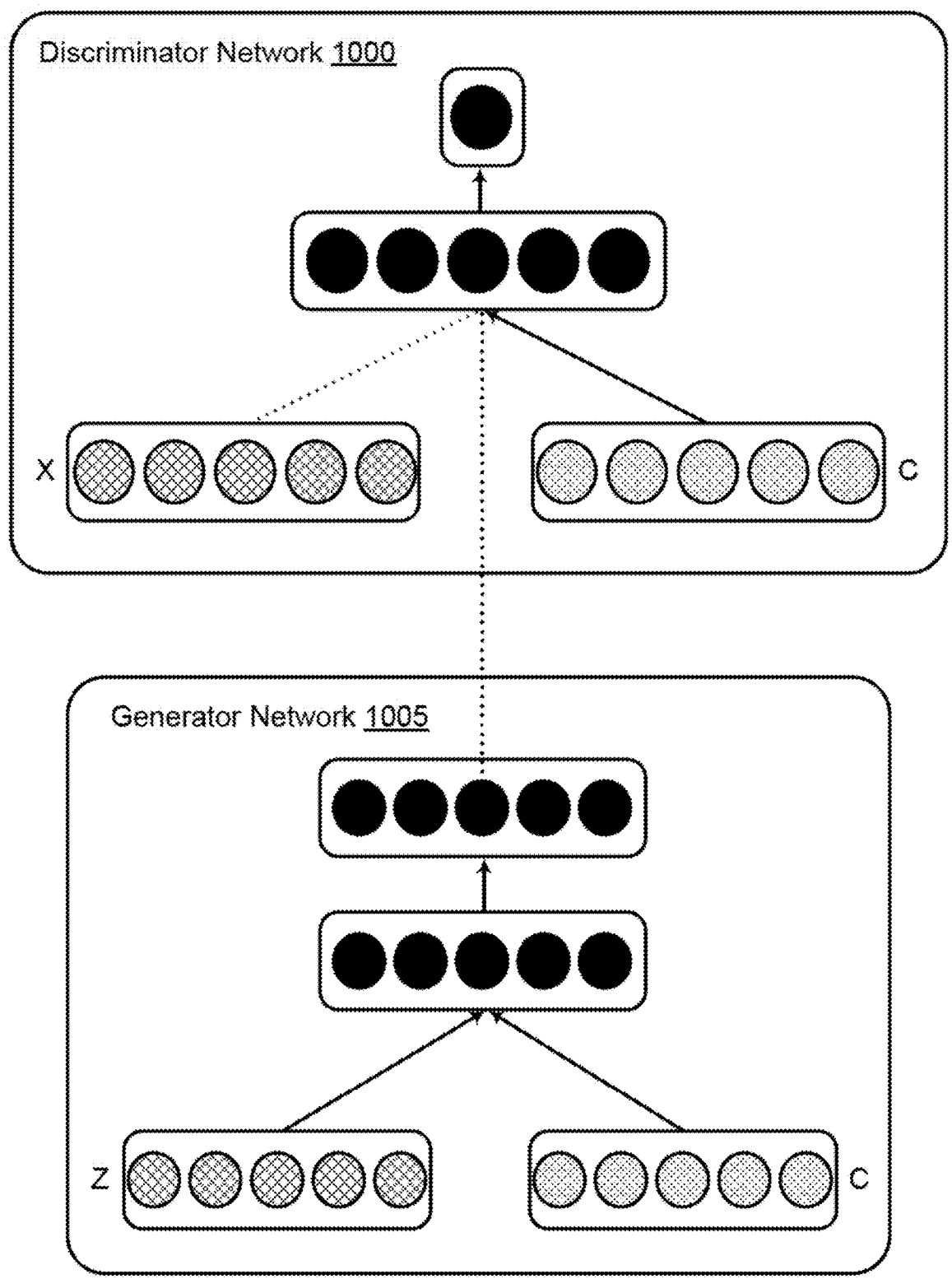
FIG. 10 shows an example of a diagram for training a generator network according to aspects of the present disclosure.

FIG. 10 shows an example of a diagram for training a generator network 1005 according to aspects of the present disclosure. The example shown includes discriminator network 1000 and generator network 1005, which may be used together in a process for training a GAN. Discriminator network 1000 is an example of, or includes aspects of, the corresponding element described with reference to FIG. 4. Generator network 1005 is an example of, or includes aspects of, the corresponding element described with reference to FIGS. 4 and 5.

A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network 1005 and a discriminator network 1000. The generator network 1005 generates candidates while the discriminator network 1000 evaluates them. The generator network 1005 learns to map from a latent space to a data distribution of interest, while the discriminator network 1000 distinguishes candidates produced by the generator from the true data distribution. The generator network 1005's training objective is to increase the error rate of the discriminator network 1000 (i.e., to produce novel candidates that the discriminator network 1000 classifies as real).

Accordingly, discriminator network 1000 may be configured to determine whether an image is a natural or original image, or if it is generated by the generator network 1005. Further, the generator network 1005 is trained to generate realistic images based feedback from the discriminator network 1000 (i.e., to convince the discriminator that the image is real). For instance, discriminator network 1000 may determine whether a modified image is a generated image or an original image, and a generative loss may be computed based on the determination. Accordingly, parameters of the joint embedding component (e.g., parameters of the joint conditional vector encoding) are updated based on the computed generative loss.

In some examples, as described in more detail herein, the generator network 1005 and the discriminator network 1000 may initially be trained during a first training phase without the conditional vector training, and the joint conditional vector training may be introduced progressively during a second training phase.

In one embodiment, a conditional GAN is trained using an advanced network (e.g., a StyleGAN2 method). For instance, for a 1×35 conditional embedding (e.g., C), the conditional vector may be injected progressively during training since conditional GAN training is a difficult task. In some cases, seeding is performed that trains GAN with no conditioning vector and saves the weights. Next, the seed weights are trained further with conditional setting.

In an example described herein, X is a balanced dataset subtracting the mean such that $X=X_{raw}-\text{mean}(X_{raw})$. V is a 239×35 matrix of top 35 eigenvectors such that V=PCA(X). Finally, the training dataset Z of size 100 K×35 corresponding to 100K images is obtained as Z=XV.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving an input image of a face comprising a plurality of input attributes and a plurality of input facial landmarks;
encoding the image to obtain a joint conditional vector representing the plurality of input attributes and the plurality of input facial landmarks using a joint embedding component, wherein the joint conditional vector is an input conditional vector to a mapping component of a generative adversarial network, and wherein the joint embedding component is trained to encode the plurality of input attributes and the plurality of input facial landmarks using an attribute loss based on a one-dimensional attribute vector with a plurality of values corresponding to the plurality of input attributes, respectively, and a landmark loss based on a landmark vector;
generating a latent vector based on the joint conditional vector and an identity vector using the mapping component of the generative adversarial network; and
generating a modified image based on the latent vector using the generative adversarial network.

2. The method of claim 1, further comprising:
identifying an identity vector representing an identity of the face in the image; and
combining the identity vector with the joint conditional vector to obtain the latent vector.

3. The method of claim 2, further comprising:
modifying the identity vector, wherein the latent vector is based on the modified identity vector and the modified image represents an identity different from an identity of the face in the image.

4. The method of claim 1, further comprising:
decomposing the joint conditional vector to obtain an attribute vector representing the plurality of input attributes and a landmark vector representing the plurality of input facial landmarks;
receiving an edit command that indicates a change to an attribute of the plurality of attributes;
modifying the attribute vector based on the edit command; and
combining the modified attribute vector with the landmark vector to obtain a modified joint conditional vector, wherein the latent vector is based the combined modified joint conditional vector.

5. The method of claim 1, further comprising:
modifying the latent vector, wherein the modified image differs from the input image based on the modification.

6. The method of claim 1, further comprising:
generating a noise vector, wherein the modified image is generated based on the noise vector.

7. The method of claim 1, further comprising:
receiving an image search query, wherein the input image is obtained from the image search query and the modified image comprises a generative search result for the image search query.

8. The method of claim 7, further comprising:
generating a plurality of generative search results based on the joint conditional vector.

9. The method of claim 1, further comprising:
generating a face mask indicating a location of the face in the input image; and
replacing the face in the input image with a modified face from the modified image based on the face mask.

10. The method of claim 1, further comprising:
generating a plurality of modified facial landmark vectors corresponding to a plurality of image frames, wherein the plurality of modified facial landmark vectors correspond to a motion of the face in the image;
generating a plurality of joint conditional vectors corresponding the plurality of modified facial landmark vectors;
generating a plurality of modified images corresponding to the plurality of joint conditional vectors; and
generating a video depicting the motion of the face in the image by combining the plurality of modified images.

11. A method for image processing, comprising:
receiving a training image of a face comprising a plurality of input attributes and a plurality of input facial landmarks;
encoding the image to obtain a joint conditional vector representing the plurality of input attributes and the plurality of input facial landmarks using a joint embedding component wherein the joint conditional vector is an input conditional vector to a mapping component of a generative adversarial network;
generating a latent vector based on the joint conditional vector and an identity vector using the mapping component of the generative adversarial network;
generating a modified image having the plurality of attributes and the plurality of facial landmarks based on the latent vector using the generative adversarial network;
computing an attribute loss based on a one-dimensional attribute vector with a plurality of values corresponding to the plurality input attributes;
computing a landmark loss based on a landmark vector by comparing facial landmarks of the modified image to the plurality of input facial landmarks; and updating parameters of the joint embedding component based on the attribute loss and the landmark loss.

12. The method of claim 11, further comprising:
applying an attribute regressor to the training image to obtain an input attribute vector representing the plurality of input attributes; and
applying the attribute regressor to the modified image to obtain a predicted attribute vector representing the attributes of the modified image, wherein the attribute loss is based on a difference between the input attribute vector and the predicted attribute vector.

13. The method of claim 11, further comprising:
applying a landmark regressor to the training image to obtain an input landmark vector representing the plurality of input facial landmarks; and
applying the landmark regressor to the modified image to obtain a predicted landmark vector representing the facial landmarks of the modified image, wherein the landmark loss is based on a difference between the input landmark vector and the predicted landmark vector.

14. The method of claim 11, further comprising:
determining whether the modified image is a generated image or an original image using a discriminator network; and
computing a generative loss based on the determination, wherein the parameters of the joint embedding component are updated based on the generative loss.

15. The method of claim 14, further comprising:
training a generator network and the discriminator network during a first training phase without the conditional vector training; and
introducing joint conditional vector training progressively during a second training phase.

16. An apparatus for image processing, comprising:
a joint embedding component configured to receive an input image of a face comprising a plurality of input attributes and a plurality of input facial landmarks and to encode the image to obtain a joint conditional vector representing the plurality of input attributes and the plurality of input facial landmarks, wherein the joint conditional vector is an input conditional vector to a mapping component of a generative adversarial network, and wherein the joint embedding component is trained to encode the plurality of input attributes and the plurality of input facial landmarks using an attribute loss based on a one-dimensional attribute vector with a plurality of values corresponding to the plurality of input attributes, respectively, and a landmark loss based on a landmark vector;
a mapping component configured to generate a latent vector based on the joint conditional vector and an identity vector using the mapping component of the generative adversarial network; and
a generator network configured to generate a modified image based on the latent vector using the generative adversarial network.

17. The apparatus of claim 16, further comprising:
an attribute regressor configured to generate an attribute vector representing the plurality of input attributes, wherein the attribute loss is based on the attribute regressor.

18. The apparatus of claim 16, further comprising:
a landmark regressor configured to generate a landmark vector representing the plurality of input facial landmarks, wherein the landmark loss is based on the landmark regressor.

19. The apparatus of claim 16, further comprising:
a discriminator network configured to determine whether an image is generated by the generator network, wherein the generator network is trained based on the discriminator network.

20. The apparatus of claim 16, further comprising:
a decomposition component configured to decompose the joint conditional vector to obtain an attribute vector and landmark vector.

* * * * *